(12) United States Patent
Sherlock

(10) Patent No.: US 11,226,225 B2
(45) Date of Patent: Jan. 18, 2022

(54) WORK VEHICLE, METHOD OF DETERMINING WEIGHT OF PAYLOAD, AND METHOD OF CALIBRATING A WEIGHT OF A PAYLOAD

(71) Applicant: DEERE & COMPANY, Moline, IL (US)

(72) Inventor: Lance R. Sherlock, Asbury, IA (US)

(73) Assignee: DEERE & COMPANY, Moline, IL (US)

( * ) Notice: Subject to any disclaimer, the term of this patent is extended or adjusted under 35 U.S.C. 154(b) by 141 days.

(21) Appl. No.: 16/660,970

(22) Filed: Oct. 23, 2019

(65) Prior Publication Data
US 2021/0123792 A1  Apr. 29, 2021

(51) Int. Cl.
*G01G 19/08* (2006.01)
*G01G 19/10* (2006.01)
*E02F 9/26* (2006.01)
*G01G 23/01* (2006.01)

(52) U.S. Cl.
CPC ............ *G01G 19/083* (2013.01); *E02F 9/264* (2013.01); *G01G 19/10* (2013.01); *G01G 23/01* (2013.01)

(58) Field of Classification Search
CPC ...... G01G 19/083; G01G 19/10; G01G 23/01; E02F 9/264
See application file for complete search history.

(56) References Cited

U.S. PATENT DOCUMENTS

| | | | | |
|---|---|---|---|---|
| 4,499,960 A | * | 2/1985 | Ehrich | G01G 5/04 177/1 |
| 5,178,226 A | * | 1/1993 | Bowman | B65F 3/04 177/139 |
| 5,509,293 A | * | 4/1996 | Karumanchi | G01G 19/10 177/139 |
| 5,714,719 A | * | 2/1998 | Otsuka | G01G 19/083 177/141 |
| 6,518,519 B1 | * | 2/2003 | Crane, III | E02F 9/264 177/136 |

(Continued)

FOREIGN PATENT DOCUMENTS

| | | |
|---|---|---|
| DE | 10138973 A1 | 3/2002 |
| DE | 112008003243 T5 | 10/2010 |
| WO | WO2015166210 A1 | 11/2015 |

OTHER PUBLICATIONS

German Search Report issued in application No. DE102020213291.7 dated Sep. 30, 2021 (04 pages).

*Primary Examiner* — Randy W Gibson

(57) ABSTRACT

A work vehicle, a method of determining a weight of a payload supported by a work tool mounted to an upper structure of a work vehicle, and a method of calibrating a weight of a payload supported by a work tool mounted to an upper structure of a work vehicle are provided. The work vehicle includes an undercarriage having a plurality of ground engaging members supporting the work vehicle, an upper structure rotatable relative to the undercarriage about a vertical axis, a rotation sensor configured to determine a rotation angle of the upper structure relative to the undercarriage, a work tool mounted to the upper structure and configured to support a payload, and a controller configured to determine a weight of the payload based at least partially on the rotation angle of the upper structure relative to the undercarriage.

15 Claims, 3 Drawing Sheets

(56) References Cited

U.S. PATENT DOCUMENTS

| | | | | |
|---|---|---|---|---|
| 7,912,612 | B2* | 3/2011 | Janardhan | B25J 9/1638 |
| | | | | 701/50 |
| 8,156,048 | B2* | 4/2012 | Mintah | E02F 9/264 |
| | | | | 705/50 |
| 8,924,094 | B2* | 12/2014 | Faivre | E02F 9/2029 |
| | | | | 701/50 |
| 9,464,403 | B2* | 10/2016 | Shatters | E02F 3/422 |
| 10,982,415 | B2* | 4/2021 | Leslie | G01G 5/06 |
| 2008/0319710 | A1* | 12/2008 | Hsu | E02F 9/264 |
| | | | | 702/174 |
| 2014/0107897 | A1 | 4/2014 | Zhu et al. | |
| 2015/0027789 | A1* | 1/2015 | Ellis | B66F 9/065 |
| | | | | 177/1 |
| 2015/0354177 | A1* | 12/2015 | Shatters | G01G 19/10 |
| | | | | 414/21 |
| 2017/0131134 | A1* | 5/2017 | Kang | G01G 19/083 |
| 2018/0274210 | A1* | 9/2018 | Nishimura | E02F 3/425 |
| 2020/0011029 | A1* | 1/2020 | Sano | G01G 19/083 |

* cited by examiner

WORK VEHICLE, METHOD OF DETERMINING WEIGHT OF PAYLOAD, AND METHOD OF CALIBRATING A WEIGHT OF A PAYLOAD

BACKGROUND

Work vehicles may include an upper structure that is capable of rotating, pivoting, or otherwise moving relative to the lower structure of the work vehicle. The work vehicle may include a work tool connected to the upper structure that is capable of supporting material as a payload having a payload weight. The work tool may support the payload while the upper structure is positioned at different positions relative to the lower structure of the work vehicle.

SUMMARY

Various aspects of examples of the present disclosure are set out in the claims.

In accordance with an embodiment of the present disclosure, a work vehicle is provided that includes an undercarriage having a plurality of ground engaging members supporting the work vehicle, an upper structure rotatable relative to the undercarriage about a vertical axis, a rotation sensor configured to determine a rotation angle of the upper structure relative to the undercarriage, a work tool mounted to the upper structure and configured to support a payload; and a controller configured to determine a weight of the payload based at least partially on the rotation angle of the upper structure relative to the undercarriage.

The controller may be further configured to determine the weight of the payload based on a pressure of a fluid in fluid communication with an actuator mounted to the upper structure. The work vehicle may further include a boom mounted to the upper structure, wherein the actuator is coupled to the boom. The controller may be configured to determine the weight of the payload using a gain value associated with the rotation angle of the upper structure relative to the undercarriage.

In accordance with an embodiment of the present disclosure, a method of determining a weight of a payload supported by a work tool mounted to an upper structure of a work vehicle is provided. The method includes supporting the payload with the work tool, determining a first payload weight associated with the payload, determining a rotation angle of the upper structure relative to an undercarriage of the work vehicle about a vertical axis, and determining a second payload weight of the payload based on the first payload weight and the rotation angle.

Determining the first payload weight may include sensing a pressure of a fluid in fluid communication with an actuator mounted to the upper structure. The method of determining the weight of the payload may further include determining a gain value for the rotation angle of the upper structure relative to the undercarriage, wherein determining the second payload weight may include applying the gain value to the first payload weight. The method of determining the weight of the payload may further include rotating the upper structure relative to the undercarriage of the work vehicle about the vertical axis before determining the rotation angle of the upper structure relative to the undercarriage of the work vehicle about the vertical axis.

In accordance with an embodiment of the present disclosure, a method of calibrating a weight of a payload supported by a work tool mounted to an upper structure of a work vehicle is provided. The method includes rotating the upper structure relative to an undercarriage of the work vehicle through a plurality of rotational positions, determining a plurality of weight values for the plurality of rotational positions, and generating a gain value for each of the plurality of rotational positions based on the plurality of weight values.

Rotating the upper structure relative to the undercarriage of the work vehicle through the plurality of rotational positions may further include rotating the upper structure without the payload being supported by the work tool. Determining the plurality of weight values may further include sensing a pressure of a fluid in fluid communication with an actuator mounted to the upper structure of the work vehicle. The method of calibrating the weight of the payload may further include storing the gain value for each of the plurality of rotational positions based on the plurality of weight values. The method of calibrating the weight of the payload may further include positioning the work tool at a predetermined position before rotating the upper structure relative to the undercarriage of the work vehicle. The method of calibrating the weight of the payload may further include positioning a boom mounted to the upper structure at a predetermined position before rotating the upper structure relative to the undercarriage of the work vehicle.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one embodiment of the subject matter of this disclosure is understood by referring to FIGS. 1 through 4 of the drawings.

Figure 1:
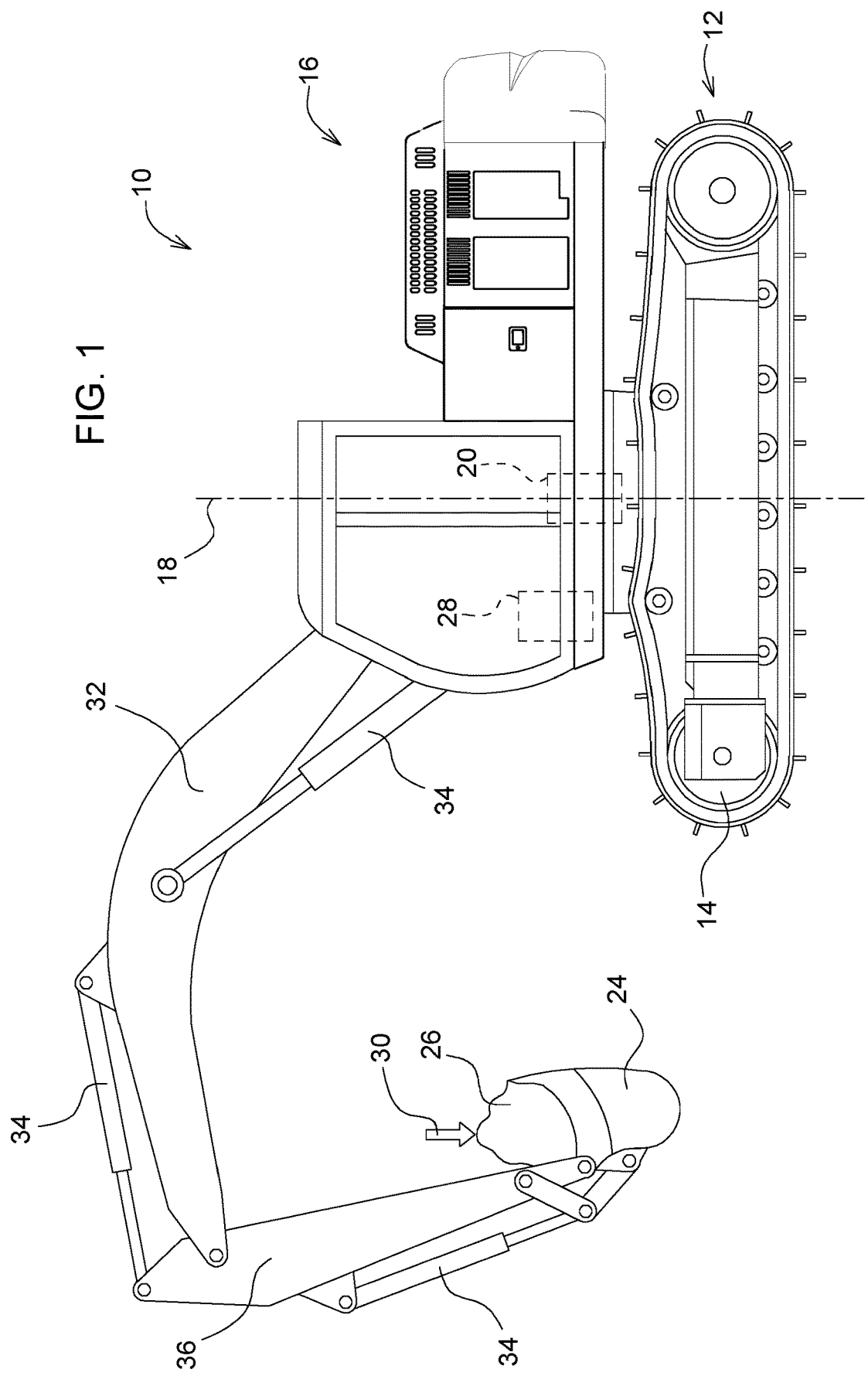
FIG. 1 is a side elevation view of a work vehicle in accordance with an embodiment of the present disclosure.

Referring now to FIG. 1, a work vehicle 10 is provided in accordance with an embodiment of the present disclosure. The work vehicle 10 shown in the illustrated embodiment is an excavator, but additional embodiments of the work vehicle 10 of the present disclosure includes another type of construction work vehicle, a utility vehicle, or a work vehicle used for agriculture, road building, or another purpose. The work vehicle 10 includes an undercarriage 12 having ground engaging members 14 supporting the work vehicle 10. The ground engaging members 14 of the illustrated embodiment include track assemblies, but the ground engaging member(s) 14 of additional embodiments includes any combination of wheels, tracks, static support, or other type of ground engaging member capable of supporting the work vehicle 10. The work vehicle 10 of the illustrated embodiment further includes an upper structure 16 rotatable relative to the undercarriage 12. The upper structure 16 is configured to be rotatable relative to the undercarriage 12 about a vertical axis 18. As used herein, the rotatability of the upper structure 16 or the work tool 24 relative to the undercarriage 12 may include the ability to pivot, rotate, or otherwise move relative to the undercarriage 12. One with ordinary skill in the art will recognize that the vertical axis 18, as described herein, may be substantially aligned with an axis that includes, in non-limiting examples, being substantially perpendicular to a ground surface upon which the work vehicle 10 is positioned and/or substantially perpendicular to the force of gravity on the work vehicle 10.

Figure 2:
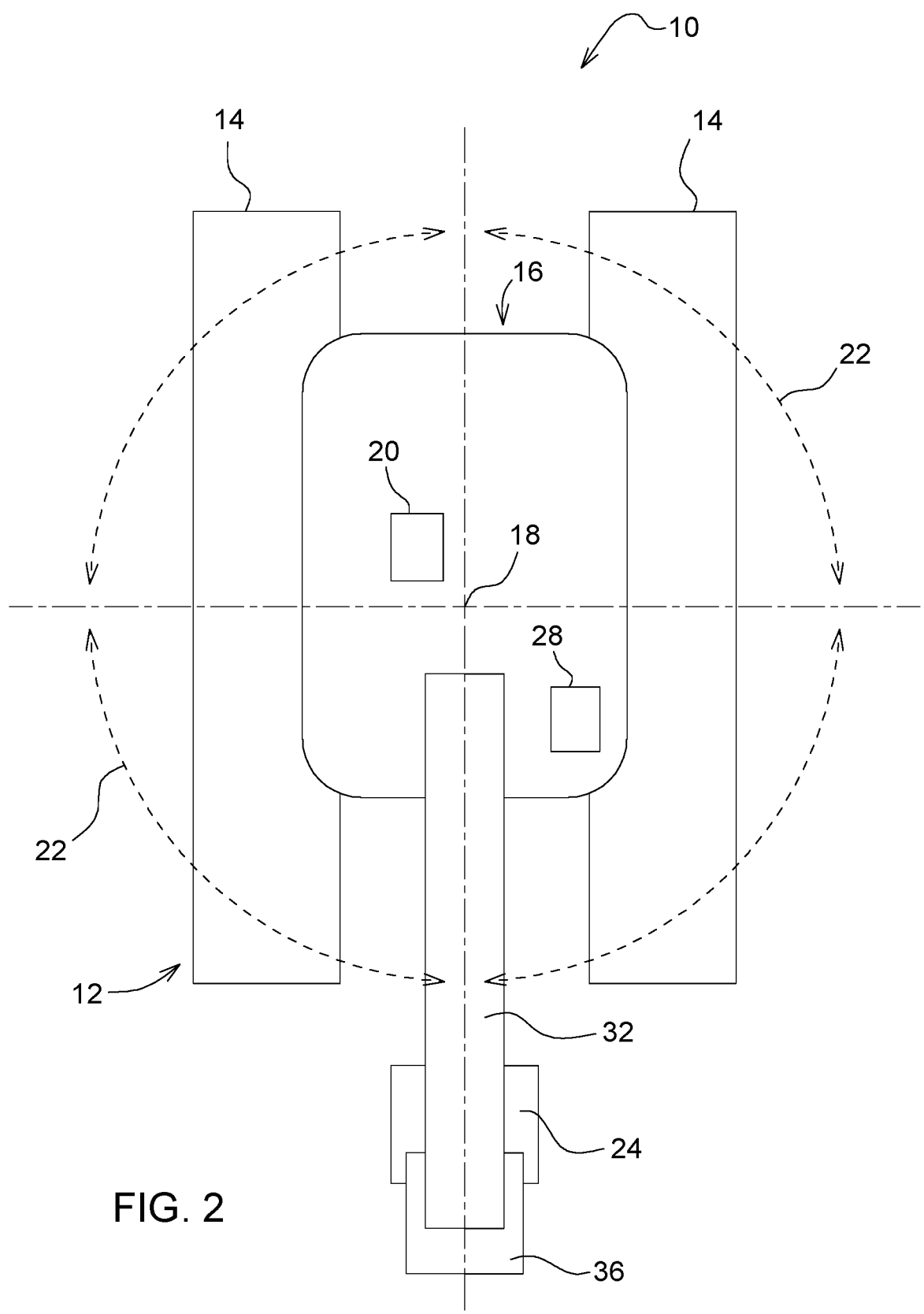
FIG. 2 is a top plan view of a work vehicle in accordance with an embodiment of the present disclosure.

Referring now to FIG. 2 with continuing reference to FIG. 1, the work vehicle 10 includes a rotation sensor 20 that is configured to determine a rotation angle 22 of the upper structure 16 relative to the undercarriage 12. As is the case with the illustrated embodiment, the rotation angle 22 of some embodiments of the present disclosure represents the position of the work tool 24 relative to the undercarriage 12. Accordingly, the rotation angle 22 may refer to either the work tool 24 or the upper structure 16 in the embodiments of the present disclosure. The rotation sensor 20 of the illustrated embodiment includes a hall effect sensor, but in additional embodiments, the rotation sensor 20 includes a rotary encoder and/or other type of system or sensor component known in the art as being configured to determine the rotation angle 22. The rotation sensor 20 and/or the work vehicle 10 of the illustrated embodiment is configured to determine the rotation angle 22 within a range of degrees (e.g., +−5 degrees rotation, in a non-limiting example), but the rotation sensor 20 of various embodiments is configured to determine the rotation angle 22 in accordance with any level of precision or within any range of degrees rotation.

The work vehicle 10 of the illustrated embodiment further includes a work tool 24 mounted to the upper structure 16 and configured to support a payload 26, as illustrated in FIG. 1. The work tool 24 of the embodiment illustrated in FIGS. 1 and 2 includes a bucket, but the work tool 24 includes any component or assembly capable of supporting the payload 26 in additional embodiments. The payload 26 of various embodiments includes dirt, rocks, loose debris, and/or any other material capable of being supported by the work tool 24. Although not included in all embodiments of the present disclosure, the work vehicle 10 of the illustrated embodiment further includes a boom 32 mounted to the upper structure 16. Although not included in all embodiments of the present disclosure, the work vehicle 10 of the illustrated embodiment further includes a stick 36 configured to connect the boom 32 to the work tool 24.

The work vehicle 10 of one or more embodiments includes one or more actuator(s) 34, as illustrated in FIG. 1. As used in the present disclosure, the actuator 34 refers to a single actuator or multiple actuators operating together for actuation of a component or operating separately. The actuators 34 illustrated in FIGS. 1 and 2 are hydraulic cylinders configured for operation by a fluid. In one or more embodiments, the work vehicle 10 includes one or more pressure sensor(s) (not shown) or pressure-sensing system(s) in fluid connection with the fluid of any one or more of the actuator(s) 34 to determine a pressure of the fluid in fluid communication with the actuator(s) 34. In a non-limiting example, one or more pressure sensor(s) is/are located inside a hydraulic cylinder of the actuator 34 coupling the boom 32 to the upper structure 16. In an embodiment, the actuator 34 is coupled to and/or is configured to actuate movement of the boom 32. In an embodiment, the actuator 34 is coupled to and/or is configured to actuate movement of the stick 36. In an embodiment, the actuator 34 is coupled to and/or is configured to actuate movement of the work tool 24.

The work vehicle 10 includes a controller 28 that is configured to determine a weight 30 of the payload 26, as illustrated in FIG. 1. In an embodiment, the controller 28 is further configured to determine the weight 30 of the payload 26 based on the pressure of the fluid in fluid communication with the actuator 34 mounted to the upper structure 16 and the boom 32. In additional embodiments, the controller 28 is further configured to determine the weight 30 of the payload 26 based on the pressure of the fluid in fluid communication with the actuator(s) 34 mounted to the stick 36 and/or the work tool 24 instead of or in addition to the pressure of the fluid in fluid communication with the actuator 34 mounted to the upper structure 16 and the boom 32. The controller 28 in a non-limiting example determines the weight as a linear or non-linear correlation with the pressure sensed by one or more of the pressure sensor(s) in fluid communication with one or more of the actuator(s) 34. In additional embodiments not shown, the controller 28 is configured to determine the weight 30 of the payload 26 using one or more other types of sensors or systems known by one having ordinary skill in the art.

In particular embodiments of the present disclosure, the controller 28 of the illustrated embodiment is configured to determine the weight 30 of the payload 26, or a calibrated weight, based at least partially on the rotation angle 22 of the upper structure 16 relative to the undercarriage 12. In a further embodiment, which is shown in FIG. 2 but may not be included in all embodiments of the present disclosure, the controller 28 is configured to determine the weight 30 of the payload 26 based at least partially on the rotation angle 22 of the work tool 24 relative to the undercarriage 12. The controller 28 of one or more embodiments is configured to determine the weight 30 of the payload 26 using a gain value associated with the rotation angle 22 of the upper structure 16 relative to the undercarriage 12. The gain value of one embodiment is a fractional or percent reduction in weight value. In a non-limiting example and merely for illustration purposes, a gain value for each of various rotation angles 22 of the upper structure 16 and/or the work tool 24 is provided below.

| Rotation Angle | Gain Value |
| --- | --- |
| 45° | −0.015 |
| 90° | −0.03 |
| 135° | −0.015 |
| 180° | 0 |
| 225° | −0.015 |
| 270° | −0.03 |
| 315° | −0.015 |
| 360° | 0 |

In an embodiment, the controller 28 determines the weight 30, as a calibrated or corrected value, for each rotation angle 22 by subtracting a weight factor determined by the gain values illustrated in the non-limiting example above from the uncalibrated or sensed weight of the payload 26. In the non-limiting example above, the weight factor is determined by multiplying the sensed weight by the gain value, but it will be appreciated that a gain value or weight factor may be determined or applied in accordance with other methods known in the art. At least one method of determining gain values and/or calibrating the weight 30 of the payload 26 is described in further detail below. Further, although each rotation angle 22 is illustrated in the non-limiting example above as having a range of 45 degrees, it will be appreciated that any range of degrees may be utilized to determine the rotation angle 22 or assign gain values in additional embodiments of the present disclosure.

Figure 3:
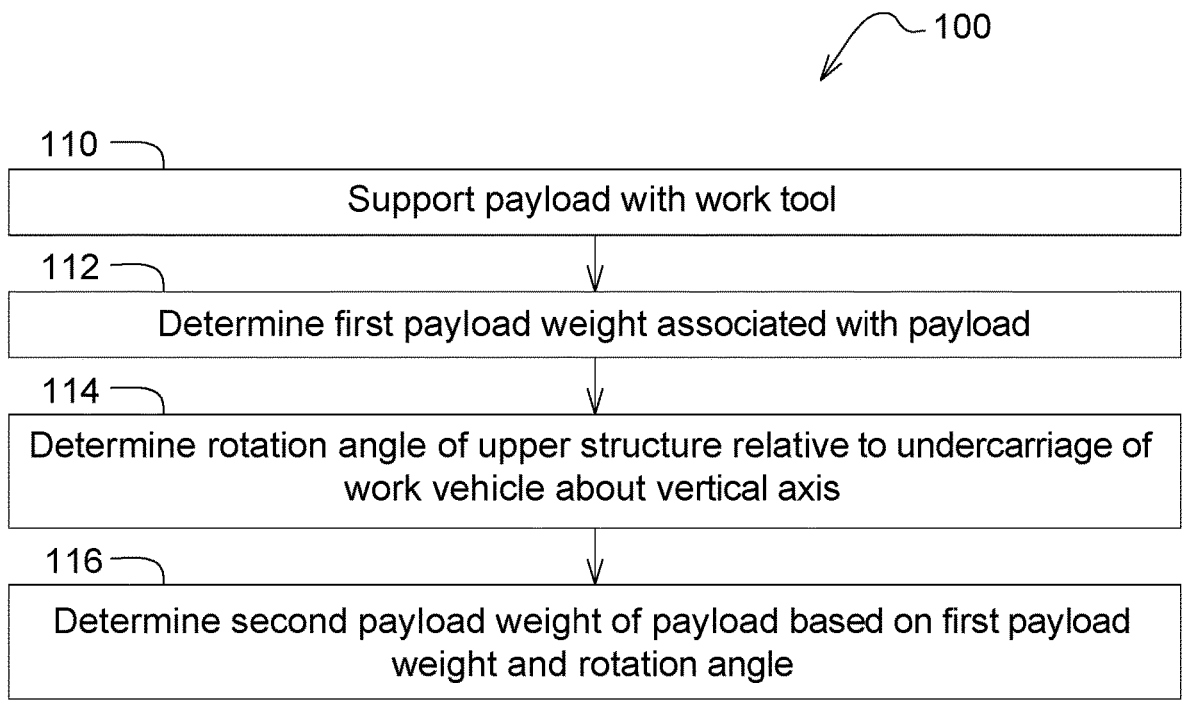
FIG. 3 illustrates a method of determining a weight of a payload in accordance with an embodiment of present disclosure.

Referring now to FIG. 3, a method 100 of determining the weight 30 of the payload 26 supported by the work tool 24 mounted to the upper structure 16 of the work vehicle 10 is illustrated in accordance with an embodiment of the present disclosure. The method 100 includes supporting, at step 110, the payload 26 with the work tool 24. The method 100 further includes determining, at step 112, a first payload weight associated with the payload 26. The first payload weight of an embodiment is an uncalibrated payload weight. In an embodiment, determining the first payload weight or uncalibrated payload weight includes sensing the pressure of the fluid in fluid communication with the actuator 34 mounted to the upper structure 16. The method 100 further includes determining, at step 114, the rotation angle 22 of the upper structure 16 relative to the undercarriage 12 of the work vehicle 10 about the vertical axis 18. The method 100 further includes determining, at step 116, a second payload weight of the payload 26 based on the first payload weight and the rotation angle 22. The second payload weight of an embodiment is a calibrated payload weight.

In an embodiment, the method 100 further includes determining the gain value for the rotation angle 22 of the upper structure 16 relative to the undercarriage 12. Determining the second payload weight or calibrated payload weight in an embodiment includes applying the gain value to the first payload weight or the uncalibrated payload weight.

In an embodiment, the method 100 includes rotating the upper structure 16 relative to the undercarriage 12 of the work vehicle 10 about the vertical axis 18 before determining the rotation angle 22 of the upper structure 16 relative to the undercarriage 12 of the work vehicle 10 about the vertical axis 18.

Figure 4:
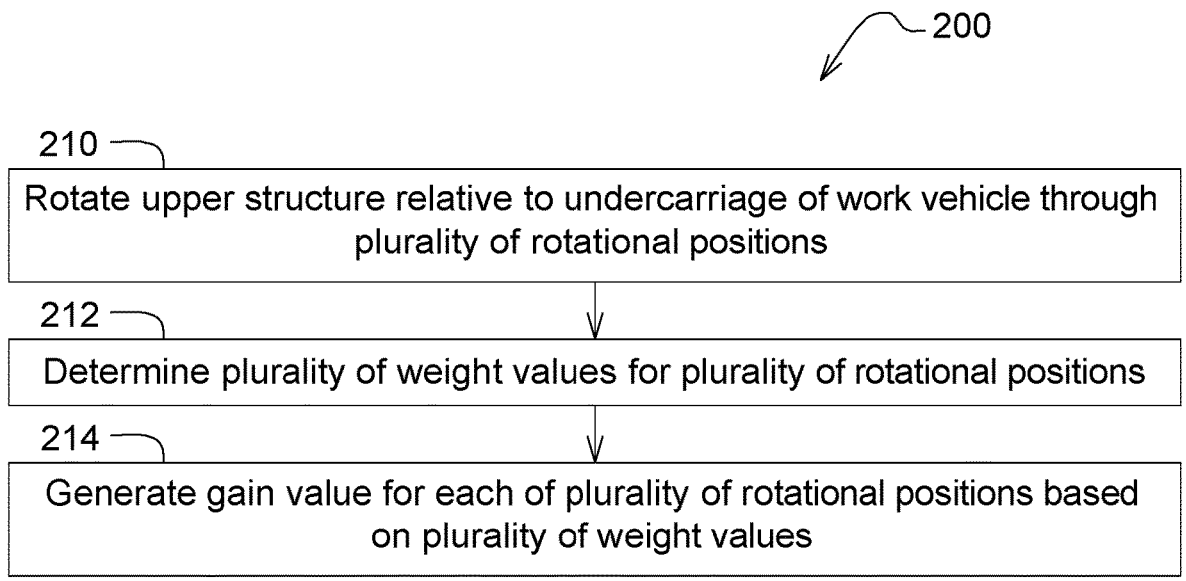
FIG. 4 illustrates a method of calibrating a weight of a payload in accordance with an embodiment of the present disclosure.

Referring now to FIG. 4, a method 200 of calibrating the weight 30 of the payload 26 supported by the work tool 24 mounted to the upper structure 16 of the work vehicle 10 is illustrated. The method 200 includes rotating, at step 210, the upper structure 16 relative to the undercarriage 12 of the work vehicle 10 through multiple rotational positions, each having a rotation angle 22. The rotational positions described herein are equal to the rotation angles 22 described previously in particular embodiments. In additional embodiment, the rotational positions may include a different range of rotational values, including a range less than 360 degrees, and/or greater or fewer rotational positions across 360 degrees. In an embodiment, the method 200 includes positioning the work tool 24 at a predetermined position, such as the position shown in FIG. 2 as a non-limiting example, before rotating the upper structure 16 relative to the undercarriage 12 of the work vehicle 10. In an embodiment, the method 200 further includes positioning the boom 32 mounted to the upper structure 16 at a predetermined position, such as the position shown in FIG. 2 as a non-limiting example, before rotating the upper structure 16 relative to the undercarriage 12 of the work vehicle 10. In an additional embodiment not illustrated, the method 200 includes positioning the boom 32 at any position, such as perpendicular to the ground surface in a non-limiting example, before rotating the upper structure 16 relative to the undercarriage 12 of the work vehicle 10. In an embodiment, rotating the upper structure 16 relative to the undercarriage 12 of the work vehicle 10 through the rotational positions includes rotating the upper structure 16 without the payload 26 being supported by the work tool 24.

The method 200 includes determining, at step 212, weight values for the rotational positions. In an embodiment, determining the weight values includes sensing the pressure of the fluid in fluid communication with the actuator 34 mounted to the upper structure 16 of the work vehicle 10. The method 200 includes generating, at step 214, a gain value for each of the rotational positions based on the weight values. As previously described, a set of gain values is determined in association with the rotation angles 22. In an embodiment, the method 200 further includes storing the gain value for each of the rotational positions or rotation angles 22 based on the weight values.

The method 200 may be initiated and/or otherwise controlled automatically or manually and/or may include various steps executed during normal operation of the work vehicle 10 in embodiments of the present disclosure. In a non-limiting example, the step 210 of rotating the upper structure 16 relative to the undercarriage 12 of the work vehicle 10 through multiple rotational positions or rotation angles 22 and determining, at step 212, weight values for the rotational positions or rotation angles 22 is executed during normal operation of the work vehicle 10.

Any feature, step, function, or structure described with regard to the embodiments of the work vehicle 10 are applied to one or both of the methods 100, 200, and vice versa, in additional embodiments of the present disclosure. Further, any or all of the steps of the method 200 of calibrating the weight 30 of the payload 26 may be combined or included with the method 100 determining the weight 30 of the payload 26, and vice versa, in additional embodiments of the present disclosure.

Without in any way limiting the scope, interpretation, or application of the claims appearing below, it will be appreciated that the embodiments of the present disclosure provide the work vehicle 10 and the methods 100, 200 to improve the accuracy of weight determination of the payload 26 when the work tool 24 is supporting the payload 26 and the upper structure 16 and/or the work tool 24 is positioned at different positions relative to the undercarriage 12 of the work vehicle 10. In a non-limiting example, precise weight for materials loaded by the work tool 24 into a transport vehicle may be important for vehicle weight capacity, road or waterway restrictions, and/or other limitations. The uncalibrated weight determination from sensing components or systems may vary based on rotation angle 22 due to work vehicle characteristics, terrain grade and/or other ground conditions, and/or work tool or boom characteristics. The method 200 calibrates the weight 30 of the payload 26 based on the rotation angle 22 of the upper structure 16 to increase the accuracy of the weight determination, such as when a weight determination may be affected by such conditions or characteristics for the position of the work tool 24 and/or the upper structure 16 in the non-limiting embodiments. The vehicle 10 and the method 100 use the calibrated weight values for the payload 26 to improve accuracy of the weight determination based on the operation of the work vehicle 10.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A work vehicle comprising:
    an undercarriage having a plurality of ground engaging members supporting the work vehicle;
    an upper structure rotatable across 360 degrees relative to the undercarriage about a vertical axis;
    a rotation sensor configured to determine a rotation angle of the upper structure across 360 degrees relative to the undercarriage;
    a work tool mounted to the upper structure and configured to support a payload; and
    a controller configured to determine a weight of the payload based at least partially on the rotation angle of the upper structure across 360 degrees relative to the undercarriage; wherein the controller is configured to determine the weight of the payload using a gain value associated with the rotation angle of the upper structure across 360 degrees relative to the undercarriage.

2. The work vehicle of claim 1, wherein the controller is further configured to determine the weight of the payload based on a pressure of a fluid in fluid communication with an actuator mounted to the upper structure.

3. The work vehicle of claim 2, further comprising a boom mounted to the upper structure, wherein the actuator is coupled to the boom.

4. A method of determining a weight of a payload supported by a work tool mounted to an upper structure of a work vehicle, the method comprising:
    supporting the payload with the work tool;
    determining a first payload weight associated with the payload;
    determining a rotation angle of the upper structure across 360 degrees relative to an undercarriage of the work vehicle about a vertical axis;
    determining a second payload weight of the payload based on the first payload weight and the rotation angle; and
    determining a gain value for the rotation angle of the upper structure across 360 degrees relative to the undercarriage, wherein determining the second payload weight comprises applying the gain value to the first payload weight.

5. The method of claim 4, wherein determining the first payload weight comprises sensing a pressure of a fluid in fluid communication with an actuator mounted to the upper structure.

6. The method of claim 4, further comprising rotating the upper structure across 360 degrees relative to the undercarriage of the work vehicle about the vertical axis before determining the rotation angle of the upper structure across 360 degrees relative to the undercarriage of the work vehicle about the vertical axis.

7. A method of calibrating a weight of a payload supported by a work tool mounted to an upper structure of a work vehicle, the method comprising:
    rotating the upper structure across 360 degrees relative to an undercarriage of the work vehicle about a vertical axis through a plurality of rotational positions of the upper structure across 360 degrees relative to the undercarriage of the work vehicle;
    determining a plurality of weight values for the plurality of rotational positions of the upper structure across 360 degrees; and
    generating a gain value for each of the plurality of rotational positions based on the plurality of weight values.

8. The method of claim 7, wherein rotating the upper structure across 360 degrees relative to the undercarriage of the work vehicle about a vertical axis through the plurality of rotational positions comprises rotating the upper structure about the vertical axis across 360 degrees without the payload being supported by the work tool.

9. The method of claim 7, wherein determining the plurality of weight values comprises sensing a pressure of a fluid in fluid communication with an actuator mounted to the upper structure of the work vehicle.

10. The method of claim 7, further comprising storing the gain value for each of the plurality of rotational positions based on the plurality of weight values.

11. The method of claim 7, further comprising positioning the work tool at a predetermined position before rotating the upper structure across 360 degrees relative to the undercarriage of the work vehicle.

12. The method of claim 7, further comprising positioning a boom mounted to the upper structure at a predetermined position before rotating the upper structure across 360 degrees relative to the undercarriage of the work vehicle.

13. The work vehicle of claim 1, wherein the gain value associated with the rotation angle of the upper structure across 360 degrees relative to the undercarriage is determined automatically during normal operation of the work vehicle.

14. The method of claim 4, wherein determining the gain value for the rotation angle of the upper structure across 360 degrees relative to the undercarriage comprises determining the gain value automatically during normal operation of the work vehicle.

15. The method of claim 7, wherein determining the plurality of weight values for the plurality of rotational positions of the upper structure across 360 degrees is determined automatically during normal operation of the work vehicle.

* * * * *